United States Patent [19]

Jungen

[11] Patent Number: 4,540,158
[45] Date of Patent: Sep. 10, 1985

[54] PNEUMATIC VALVE

[75] Inventor: Hans-Ulrich Jungen, Chancy, Switzerland

[73] Assignee: Honeywell Lucifer SA, Geneva, Switzerland

[21] Appl. No.: 615,408

[22] Filed: May 30, 1984

[51] Int. Cl.³ .............................................. F16K 51/00
[52] U.S. Cl. .................................... 251/367; 251/143; 137/343
[58] Field of Search ................. 251/143, 367; 137/343

[56] References Cited

U.S. PATENT DOCUMENTS

| 2,920,650 | 1/1960 | Moog, Jr. | 251/367 |
| 3,060,970 | 10/1962 | Aslan | 251/367 |
| 3,106,939 | 10/1963 | Flick | 251/367 |
| 3,163,175 | 12/1964 | Pearson | 251/367 |
| 3,584,651 | 6/1971 | Paschke | 251/367 |
| 3,584,653 | 6/1971 | Kubo | 251/367 |
| 4,280,527 | 7/1981 | Pease | 251/143 |

Primary Examiner—A. Michael Chambers
Attorney, Agent, or Firm—Mitchell J. Halista; Trevor B. Joike

[57] ABSTRACT

A pneumatic valve uses a body made of a synthetic material with a plurality of internal fluid ducts opening onto a face of the body via respective orifices. A metal plate is arranged in contact with the aforesaid face and is provided with sockets aligned with respective ones of the duct orifices and each containing a tapped hole capable of receiving a threaded connecting pipe. Resilient O-rings are used to provide a fluid-tight seal between the sockets and the ducts.

5 Claims, 7 Drawing Figures

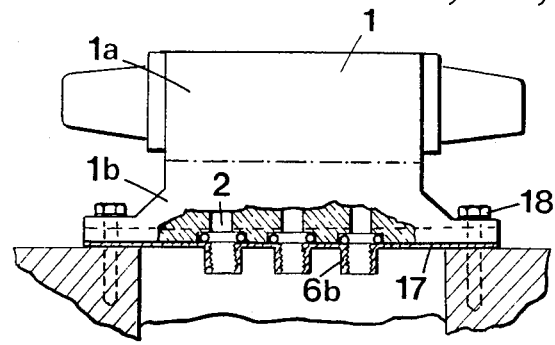
FIG. 4
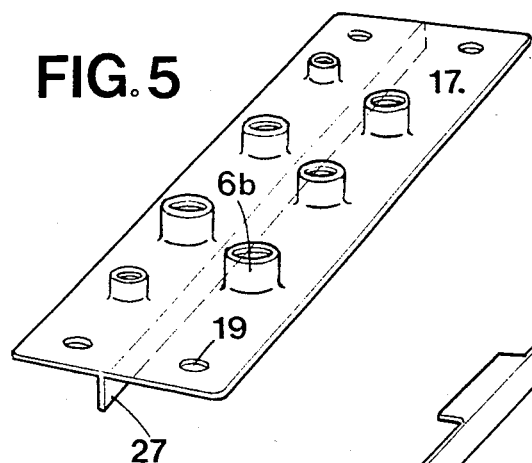
FIG. 5
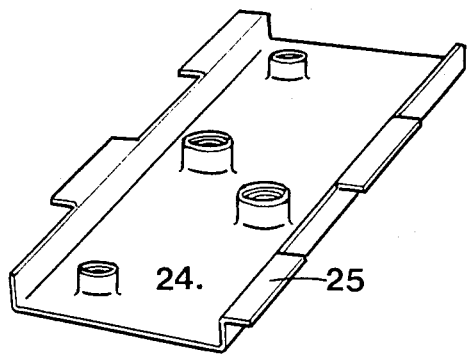
FIG. 7
FIG. 6
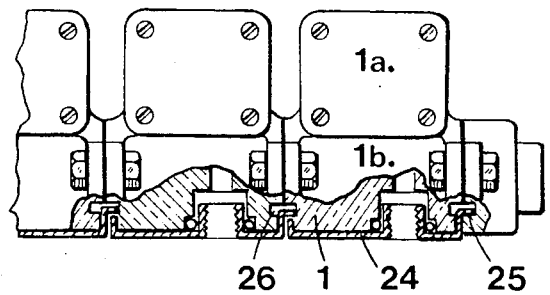

PNEUMATIC VALVE

BACKGROUND OF THE INVENTION

1. Field of the Invention

The present invention relates to a valve. More specifically, the present invention is directed to a valve having a body with a number of internal fluid ducts opening onto the same face of the body via orifices capable of receiving threaded connecting pipes.

2. Description of the Prior Art

Valves having connecting orifices are normally provied with tapped sockets, for which various types of thread (metric, BSP, NPT, etc.) are in common use. If a valve manufacturer wishes to market such valves in different countries, they must either be produced in a range of models with different threads or they must be supplied with a set of adapters, which increase both the cost price and the overall diomensions of the valves.

Furthermore, because of the stresses imposed on the valve orifice threads when the connecting pipes are tightened into the valve body, it is virtually essential to use metal threads inasmuch as the synthetic materials occasionally used for valve bodies are not strong enough for threading usage. Accordingly, it is desirable to provide a valve having a structure which overcomes these problems.

SUMMARY OF THE INVENTION

An object of the present invention is to provide an improved valve having a body with tapped fluid outlet sockets located in a separate metal plate.

In accomplishing this and other objects, there has been provided, in accordance with the present invention, a valve comprising a body means having an internal fluid duct opening onto a face of the body means via an orifice and a metal plate means contacting the body and having a tapped fluid passage socket projecting from at least one side of the plate and aligned with said orifice.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
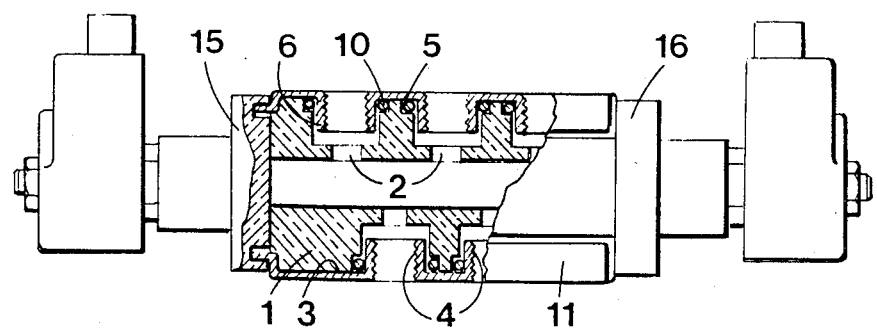
FIG. 1 is a partly sectionalized side view of a valve embodying an example of the invention.
Figure 2:
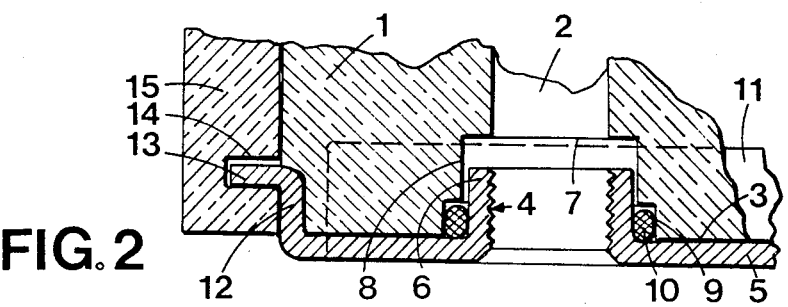
FIG. 2 is an enlarged partial sectional drawing showing certain special features of the valve illustrated in FIG. 1.
Figure 3:
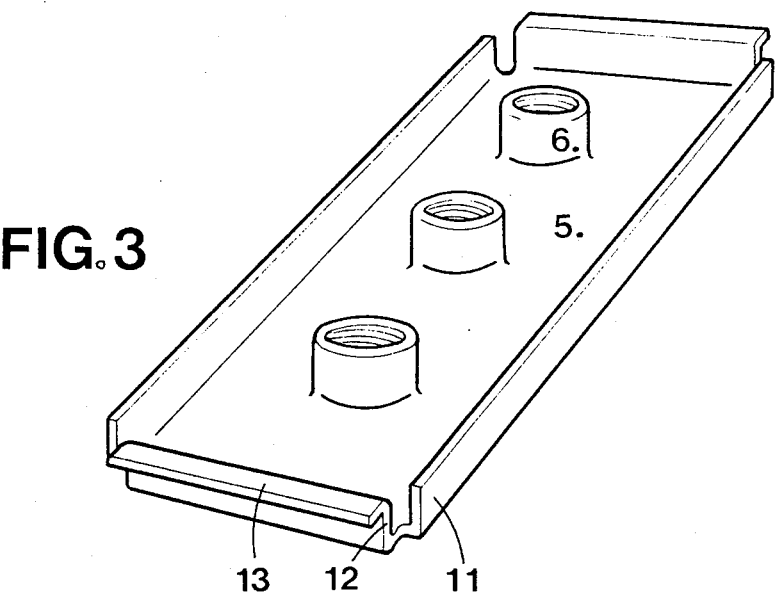
FIG. 3 is a pictorial view of one of the plates used for the valve shown in FIG. 1, FIGS. 4 and 5 illustrate a first modification of the valve shown in FIGS. 1 to 3, and FIGS. 6 and 7 illustrate a second modification of the valve shown in FIGS. 1 to 3.

A valve embodying an example of the invention is illustrated in FIGS. 1 to 3 and comprises a valve body 1 made of a synthetic material with a plurality of internal fluid ducts 2 each opening onto a face 3 of the body 1. A metal plate 5 is arranged in contact with the face 3 and is provided with a plurality of fluid passage sockets or projections 6 each perforated by a tapped hole 4. At each of the duct openings or orifices 7 of the ducts 2, the valve body 1 is provided with a recess 8 designed to receive respective ones of the projections 6. Each of these recesses 8 have an annular groove 9 housing a resilient O-ring 10. The O-rings 10 grip the outside surface of the respective one of the projections 6 to ensure a fluid seal between the projections 6 and the duct 2 when the plate 5 is mounted on the valve body 1 while the tapped holes 4 are aligned with respective ones of the ducts 2.

The metal plate 5 is provided with longitudinal stiffeners 11. The two right-angled transverse ribs 12 at the ends of the plate 5 are extended to form transverse lugs 13, which are substantially parallel to the main plane of the plate 5. The lugs 13 engage in respective slots 14 provided in the two cover end plates 15 and 16, which are, in turn, attached to the valve body 1 to thereby fix the plate 5 to the valve body 1.

The first modification illustrated in FIGS. 4 and 5 uses a metal plate 17 with threaded projections which is reinforced by a longitudinal rib 27 and held rigidly against the base 1b of the valve body 1 by the valve fastening bolts 18. The base 1b of the body is arranged to accommodate the rib 27. The plate 17 does not require the lugs 13 and uses holes 19 to admit the fastening bolts 18. Additionally, when the plate 17 is mounted on the base 1b the projections 6b face outwards from the valve body 1.

The second modification shown in FIGS. 6 and 7 relates to valve arranged side by side. This modification uses a metal plate 24 with lugs threaded projections and longitudinal stiffeners having right angle lugs 25 designed to engage respective ones of the slots 26 recessed into the bodies of other valves or terminal elements located on both sides of the valve body 1. In the types of valve assemblies illustrated in FIGS. 4 and 6 the valve body 1 often comprises two parts 1a and 1b.

The arrangement provided by the present invention allows the valve body to be made of a synthetic material for specific applications. Further, since the connecting plate is fitted and changed as a complete unit, adaptation to the standard threads specified in the various regions of the world is greatly facilitated while at the same time providing threaded connections of the required strength.

Accordingly, it may be seen that there has been provided, in accordance with the present invention, an improved valve having a body with tapped fluid passage sockets located in a separate metal plate.

The embodiments of the present invention in which an exclusive property or privilege is claimed are defined as follows:

1. A valve comprising
   a body means having an internal fluid duct opening onto a face of said body means via an orifice and
   a metal plate means contacting said face, said plate having a tapped fluid passage socket projecting from said plate means and aligned with said orifice, said plate means including fastening means for attaching said plate means to said body means, said plate means being provided with at least one stiffening rib with said body means being arranged to accommodate said rib and said plate means being provided with outwardly projecting lugs substantially parallel to the main plane of said plate means and designed to engage in slots recessed into said fastening means attached to said body or into bodies of other valves attached to the sides of said body means on which said plate means is mounted.

2. A valve in accordance with claim 1 wherein said plate means includes seal means between said plate means and said body means to provide a fluid-tight seal between said duct and said tapped socket.

3. A valve in accordance with claim 1 and wherein said body is made of synthetic material.

4. A valve as set forth in claim 1 wherein body means includes a recess for accommodating said socket and an O-ring located between an outer surface of said socket and a surface of said recess.

5. A valve as set forth in claim 1 wherein said body means has a plurality of duct opening orifices on the same face of said body means and said plate means has a plurality of tapped sockets with each of said sockets being aligned with a respective one of said orifices.

* * * * *